a2, United States Patent
Chapman et al.

US008692983B1

(10) Patent No.: US 8,692,983 B1
(45) Date of Patent: Apr. 8, 2014

(54) OPTICAL, LASER-BASED, OR LIDAR MEASURING SYSTEMS AND METHOD

(75) Inventors: Mark D. Chapman, Central City, IA (US); Wyatt L. Hendrick, San Diego, CA (US); Paul N. Smith, Cedar Rapids, IA (US); Howard Fein, Richmond Heights, OH (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 274 days.

(21) Appl. No.: 13/231,217

(22) Filed: Sep. 13, 2011

(51) Int. Cl.
*G01P 3/36* (2006.01)

(52) U.S. Cl.
USPC .............. 356/28; 356/28.5; 342/124; 342/82; 342/137; 342/202; 385/15; 385/16; 385/24; 385/37; 382/154; 369/44.14; 369/44.38; 359/831; 398/139; 398/135

(58) Field of Classification Search
USPC ............. 356/28, 28.5; 342/124, 82, 137, 202; 385/15, 16, 24, 37; 382/154; 369/44.14, 44.38, 112, 44.23; 359/831; 398/139, 135
See application file for complete search history.

(56) References Cited

U.S. PATENT DOCUMENTS

| 5,278,813 | A  | * | 1/1994  | Ohnishi et al. .............. 369/44.14 |
| 6,556,282 | B2 |   | 4/2003  | Jamieson et al. |
| 6,795,601 | B1 | * | 9/2004  | Mitchell et al. ................. 385/15 |
| 7,311,000 | B2 |   | 12/2007 | Smith et al. |
| 7,522,291 | B2 |   | 4/2009  | Hays et al. |
| 7,800,528 | B2 | * | 9/2010  | Nilsson et al. ................ 342/124 |
| 7,933,002 | B2 |   | 4/2011  | Halldorsson |
| 2003/0012425 | A1 | * | 1/2003 | Suzuki et al. ................. 382/154 |
| 2004/0208422 | A1 | * | 10/2004 | Hagood et al. .................. 385/16 |
| 2009/0142066 | A1 | * | 6/2009 | Leclair et al. ................. 398/139 |
| 2010/0128136 | A1 |   | 5/2010 | Belenkii |
| 2010/0195089 | A1 |   | 8/2010 | Wu et al. |
| 2010/0271615 | A1 | * | 10/2010 | Sebastian et al. ............ 356/4.01 |
| 2011/0043785 | A1 |   | 2/2011 | Cates et al. |
| 2011/0216307 | A1 | * | 9/2011 | Belen et al. .................. 356/28.5 |

OTHER PUBLICATIONS

"Racer's Edge Hand-held Laser Winds Sensor," Product Information Sheet for Racer's Edge® LWS, 2010, Catch the Wind, Inc.
"State-of-the-Art Wind Assessment Technology," Product Information Sheet for Windseeker™ Xtreme Laser Wind Sensor, 2010, Catch the Wind, Inc.

(Continued)

*Primary Examiner* — Isam Alsomiri
*Assistant Examiner* — Samantha K Abraham
(74) *Attorney, Agent, or Firm* — Donna P. Suchy; Daniel M. Barbieri (57) ABSTRACT

Present novel and non-trivial optical, laser-based measuring systems and method are disclosed. An optical, laser-based, or LIDAR measuring apparatus is comprised of a radiation receiver/transmitter, a beam-forming optical element, a beam steering device comprised of a deviation optical element and at least one actuator used to steer the deviation optical element in response to drive signal(s) from a processor. A method employed by the system may be comprised of the receiver/transmitter receiving a transmitter signal from the processor and transmitting promulgated radiation; the beam-forming optical element receiving the promulgated radiation and forming a beam of radiation; the deviation optical element receiving the beam of radiation, diverting a beam of radiation, receiving a reflected signal, and diverting the reflected signal; the beam-forming optical element receiving the diverted signal, forming a converging reflected signal, and directing the converging reflected signal to the radiation receiver/transmitter which receives the converging reflected signal.

21 Claims, 9 Drawing Sheets

(56) References Cited

OTHER PUBLICATIONS

"Profile the Wind Up to Tip Height," Product Information Sheet for Vindicator® Laser Wind Sensor, 2011, Catch the Wind, Inc.

"Advanced Atmospheric Measurement Solutions," Product Information Sheet for OptoAtmospherics™ Site Assessor and Optimizer, OptoAtmospherics, Ann Arbor, MI.

"Windcube Lidar Remote Sensors," Product Information Sheet for WINDCUBE® v2, 2010, Lidar Wind Technologies.

* cited by examiner

OPTICAL, LASER-BASED, OR LIDAR MEASURING SYSTEMS AND METHOD

BACKGROUND OF THE INVENTION

1. Field of the Invention

This invention pertains to the field of optical, laser-based, or LIDAR measuring devices.

2. Description of the Related Art

In conventional wind measurement systems, a mechanically-complex conical scanning mechanism or multiple separate telescopes may be used in order to make two-dimensional or three-dimensional wind velocity measurement; however, these systems are housed in apparatuses that are generally too big for a person to carry and use at the same time. Even smaller, handheld units utilize a minimum of two telescopes to obtain a wind measurement.

If the use of one telescope is proposed where the telescope is comprised of, either in part or in whole, low-cost sensors, inaccuracies are typically introduced from the inability to manually point steadily and accurately with one's hand. Since the same telescope is used for both transmitting and receiving, it is critical that any beam diversion be reciprocal. That is, the transmitted light goes out the path and the reflected light must be able to retrace the same path into the collection element which could be a fiber optic transmitter/receiver.

BRIEF SUMMARY OF THE INVENTION

The embodiments disclosed herein present novel and non-trivial optical, laser-based, or Light Detecting and Ranging ("LIDAR") (also referred to as Laser Detection and Ranging or "LADAR") measuring system and method employed by such systems. One objective of the invention is to provide a compact air measuring device, i.e., a device that is lightweight and has a small space envelope. A prototype unit of a novel, apparatus embodying the disclosures herein has a very compact volume and has an aperture diameter that is 80 mm (3.15 in) or less.

In one embodiment, the measuring system is comprised of an optical radiation transmitting source from which radiation of a selected wavelength may be propagated (through fiber optic, other waveguide, or free space) to a beam-forming refractive optical element. This optical element may modify the propagated optical radiation in such a way as to produce beams of radiation including, but not limited to, collimated, near-collimated, and/or convergent beams of radiation. The radiation is then propagated to a deviation optical element which diverts the radiation in a chosen direction. In this embodiment, the deviation optical element could be an optical wedge prism fabricated of a material appropriate to refract the wavelength of radiation entering from the deviation optical element and with appropriately angled faces defined to achieve a chosen angular diversion. The optical wedge prism is moveable in such a way as to allow continuous and variable diversion of the propagated radiation by rotation of the optical wedge prism through 360 degrees to direct the angularly-diverted beam in a circular geometry. The optical wedge prism may be rotated in various fashions such as, but not limited to, a rotating actuator or motor which is coupled to the optical wedge prism to affect the rotation of the optical wedge prism.

In another embodiment, the measuring apparatus is comprised of an optical radiation transmitting source from which radiation of a selected wavelength may be propagated to a beam-forming refracting optical element to produce beams of radiation including, but not limited to, collimated, near-collimated, and/or convergent beams of radiation. The radiation is then propagated to a deviation optical element which diverts the radiation in a chosen direction. In this embodiment, the deviation optical element could be a variable-angle optical wedge prism comprised of two or more optical window surfaces acting as boundaries containing a compliant refractive material appropriate to refract the wavelength of radiation entering from the deviation optical element. Each window may be moveable in such a way as to define the variable-angle optical wedge prism with variably-angled faces defined to achieve a chosen angular diversion. The variable-angle optical wedge prism is moveable in such a way as to allow continuous and variable diversion of the propagated radiation by angular movement of the variable-angle optical wedge prism to direct the angularly-diverted beam in a geometry allowing the beam to be pointed as desired. One or more windows of the variable-angle optical wedge prism may move angularly by various means such as, but not limited to, one or more sets of actuators coupled to the window(s) being moved to affect the angular movement of the variable-angle optical wedge prism.

In another embodiment, the measuring system is comprised of an optical radiation transmitting source from which radiation of a selected wavelength may be propagated to a beam-forming reflective optical element such as, but not limited to, an off-axis paraboloid mirror to produce beams of radiation including, but not limited to, collimated, near-collimated, and/or convergent beams of radiation. The radiation is then propagated to a deviation optical element which diverts the radiation in a chosen direction. In this embodiment, the deviation optical element could be an optical wedge prism fabricated of a material appropriate to refract the wavelength of radiation entering from the optical element and with appropriately angled faces defined to achieve a chosen angular diversion. The optical wedge prism is moveable in such a way as to allow continuous and variable diversion of the propagated radiation by rotation of the optical wedge prism through 360 degrees to direct the angularly-diverted beam in a circular geometry. The optical wedge prism may be rotated in various fashions such as, but not limited to, a rotating actuator or motor which is coupled to the optical wedge prism to affect the rotation of the optical wedge prism.

In another embodiment, the measuring system is comprised of an optical radiation transmitting source from which radiation of a selected wavelength may be propagated to a beam-forming reflective optical element such as, but not limited to, an off-axis paraboloid mirror to produce beams of radiation including, but not limited to, collimated, near-collimated, and/or convergent beams of radiation. The radiation is then propagated to a deviation optical element which diverts the radiation in a chosen direction. In this embodiment, the deviation optical element could be the variable-angle optical wedge prism (as discussed above) to direct the angularly-diverted beam in a geometry allowing the beam to be pointed as desired.

In another embodiment, the measuring system is comprised of an optical radiation transmitting source from which radiation of a selected wavelength may be propagated to a beam-forming refracting optical element to produce beams of radiation including, but not limited to, collimated, near-collimated, and/or convergent beams of radiation. The radiation is then propagated to a deviation optical element which diverts the radiation in a chosen direction. In this embodiment, the deviation optical element could be a reflective deviation mirror fabricated of a material and with reflective coatings (if necessary) appropriate to reflect the wavelength of radiation entering from the beam-forming refracting optical element. The mirror is moveable in such a way as to achieve a chosen, continuous, and/or variable angular diversion of the propagated radiation by angular movement of the mirror to direct the diverted beam in a geometry allowing the beam to be pointed as desired. The mirror may be moved by various means such as, but not limited to, a set of actuators coupled to the mirror to affect the angular movement of the mirror.

In another embodiment, the measuring system is comprised of an optical radiation transmitting source from which radiation of a selected wavelength may be propagated to a beam-forming reflective optical element such as, but not limited to, an off-axis paraboloid mirror to produce beams of radiation including, but not limited to, collimated, near-collimated, and/or convergent beams of radiation. The radiation is then propagated to a deviation optical element which diverts the radiation in a chosen direction. In this embodiment, the deviation optical element could be a movable, reflective deviation mirror as discussed in the preceding paragraph.

In another embodiment, the measuring system is comprised of an outer housing, an inner housing, and a steering optical element. The steering optical element includes an optical radiation transmitting source from which radiation of a selected wavelength may be propagated to either a beam-forming refracting optical element or a beam-forming reflecting optical element to produce beams of radiation including, but not limited to, collimated, near-collimated, and/or convergent beams of radiation. The steering optical element is disposed within a moveable inner housing, which itself is disposed within a stationary outer housing. The inner housing moves in such a way as to direct the radiation in a chosen direction and to allow for a continuous and variable diversion of the propagated radiation. The inner housing may be moved by various means such as, but not limited to, a set of actuators coupled to the mirror to affect the angular movement of the housing.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
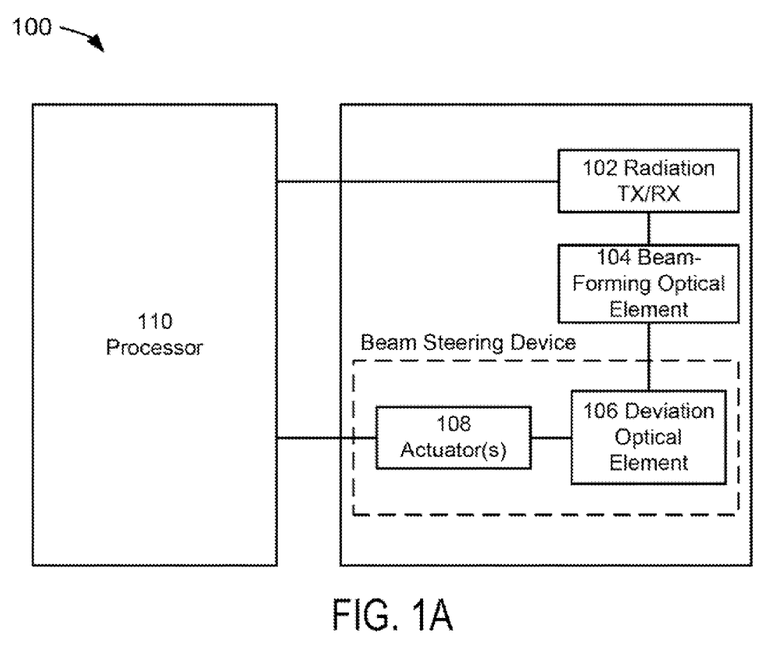
FIGS. 1A and 1B depict block diagrams of two optical, laser-based measuring systems.

FIGS. 1A and 1B depict block diagrams of an optical, laser-based, or Light Detecting and Ranging ("LIDAR") (also referred to as Laser Detection and Ranging or "LADAR") measuring system 100 suitable for implementation of the techniques described herein. The measuring system 100 embodied in FIG. 1A may include a radiation transmitter/receiver ("TX/RX") 102, a beam-forming optical element 104, a beam steering device comprised of a steering optical element 106 and one or more actuator(s) 108, and a processor 110; examples of one or more housing assemblies employing the embodied measuring system 100 of FIG. 1A are shown in FIGS. 2 through 8.

Figure 1B:
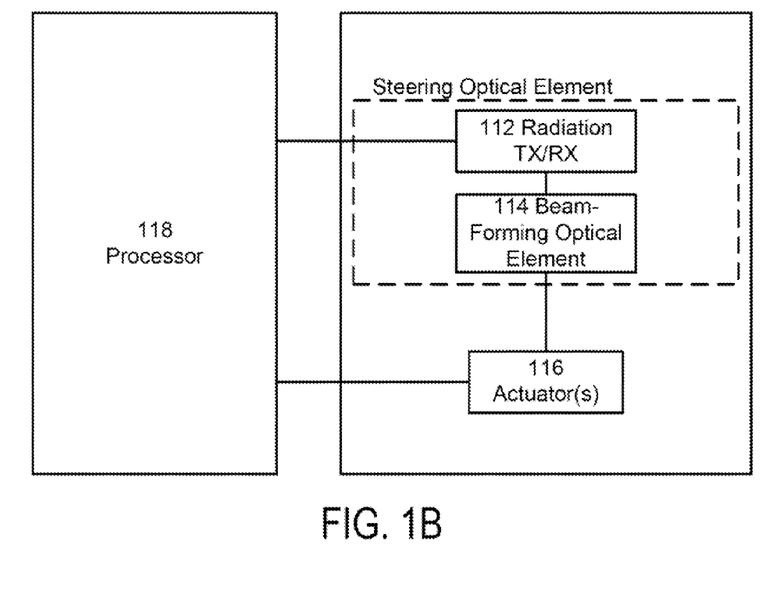
Figure 9:
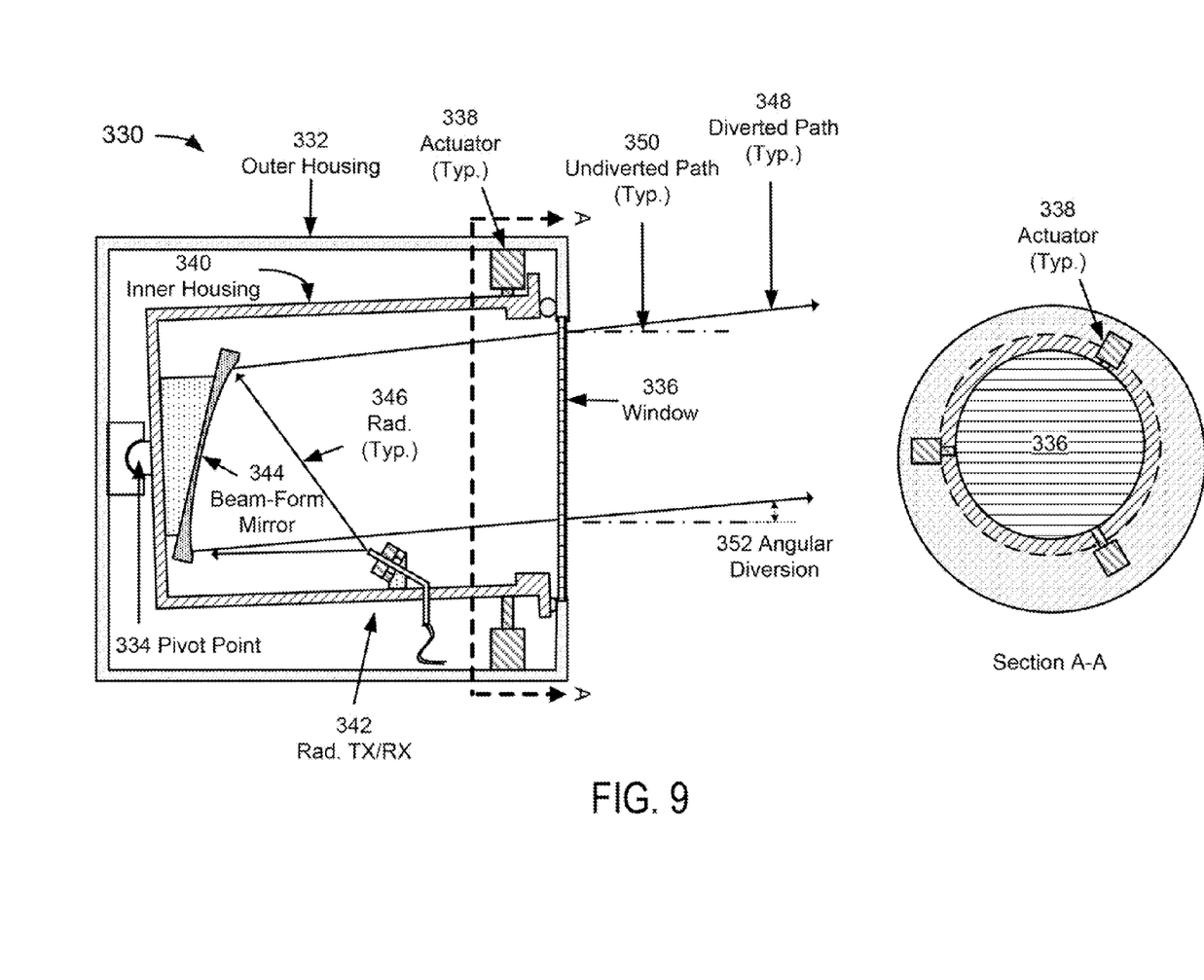
FIG. 9 depicts an eighth optical, laser-based measuring housing assembly suitable for implementing a disclosed optical, laser-based measuring system.

The measuring system 100 embodied in FIG. 1B may include a steering optical element comprised of a radiation TX/RX 112, a beam-forming optical element 114, one or more actuator(s) 116, and a processor 118; an example of a housing assembly employing the embodied measuring system 100 of FIG. 1B is shown in FIG. 9.

It should be noted that, although the discussion herein will be drawn to an optical, laser-based system for measuring wind, the embodiments herein are not limited to the measurement of wind. Instead, the embodiments disclosed herein may be applied in many other applications in which radiation may be employed such as, but not limited to, systems for measuring airspeed, air temperature, barometric pressure, altimeter, ground slope, ground speed, ground track, and/or range.

The radiation TX/RXs 102 and 112 may be comprised of a fiber optic, other waveguide, or free space transmission source and/or detectors configured in such a way as to transmit radiation and/or receive transmitted radiation after it has been reflected. When placed into use, the radiation TX/RXs 102 and 112 may promulgate radiation when a signal is received. For example, a laser or other optical radiation source of a given or chosen wavelength and a detector suitable to that radiation. As embodied herein, promulgated radiation could refer to a pulsed signal and/or a continuous signal transmitted or promulgated by the radiation TX/RX 102 and 112.

The beam-forming optical elements 104 and 114 may be comprised of optical lens and/or optical mirrors know to those skilled in the art for producing collimated beams of radiation from diverging beams of radiation when such beams are traveling in one direction. When traveling in the other direction, the optical elements 104 and 114 may produce converging beams of radiation from collimated beams of radiation.

The deviation optical element 106 may be comprised of an optical wedge in one embodiment. In another embodiment, the deviation optical element 106 could be comprised of a compressible, compliant, optical material, such as an optical gel sandwiched in between two windows. Such windows could be comprised of a material transmissive to the chosen wavelength radiation. A non-exhaustive list of transmissive compliant material in between the windows includes oils, gels, polymers, plastics, and/or liquids.

The one or more actuators 108 and 116 may be comprised of rotary actuators and/or linear actuators. Rotary actuator(s)

may be used for imparting a rotational motion upon an optical wedge. A non-exhaustive list of rotary actuator(s) includes stepper motors, solenoids, continuous rotation motors, and/or piezo-motors. Linear actuators may be used to position the deviation optical element 106 as chosen. A non-exhaustive list of linear actuators includes piezo-electric and/or electromechanical actuators.

The processors 110 and 118 may be any electronic data processing unit which executes software or source code stored, permanently or temporarily, in a digital memory storage device as discussed above. The processors 110 and 118 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing unit. As embodied herein, the processors 110 and 118 could be one or more processor(s) used by or in conjunction with any system of the aircraft.

The processors 110 and 118 may be programmed to provide the radiation TX/RXs 102 and 112 with transmit signals and the one or more actuators 108 and 116 with one or more drive signals. In addition, the processors 110 and 118 may be programmed or configured to receive as input signals from the radiation TX/RXs 102 and 112, where such signals represent the detection of reflected signals as discussed in detail below. With the employment of the processors 110 and 118, two or three measurements taken along pre-determined diverted angles during each 360 degree rotation cycle of the deviation optical element 106 may be used to, for instance, measure wind or ground speed. As embodied herein, the terms "programmed" and "configured" are synonymous with respect to the execution of software or source code developed for the specific functions and methods embodied herein. The processors 110 and 118 may be operatively coupled to the radiation TX/RXs 102 and 112 and to the one or more actuators 108 and 116 to facilitate the providing and receiving of signals; as embodied herein, electronically coupled may be considered as interchangeable with operatively coupled. The processors 110 and 118 may be programmed to execute method(s) and/or algorithms known to those skilled in the art.

One such method for determining wind speed, provided here for the purpose of illustrating and not limitation, may be based using a Doppler technique where frequency and/or phase of a reflected signal is compared with the promulgated radiation, where the difference due to the Doppler effect allows the speed to be determined. Time gating technique(s) may be employed when a specific range is chosen from which a measurement is made. One such method for determining distance, provided here for the purpose of illustration and not limitation, is to compare the difference of times, the time at which the radiation is promulgated and the time at which the reflected signal is received.

Figure 2:
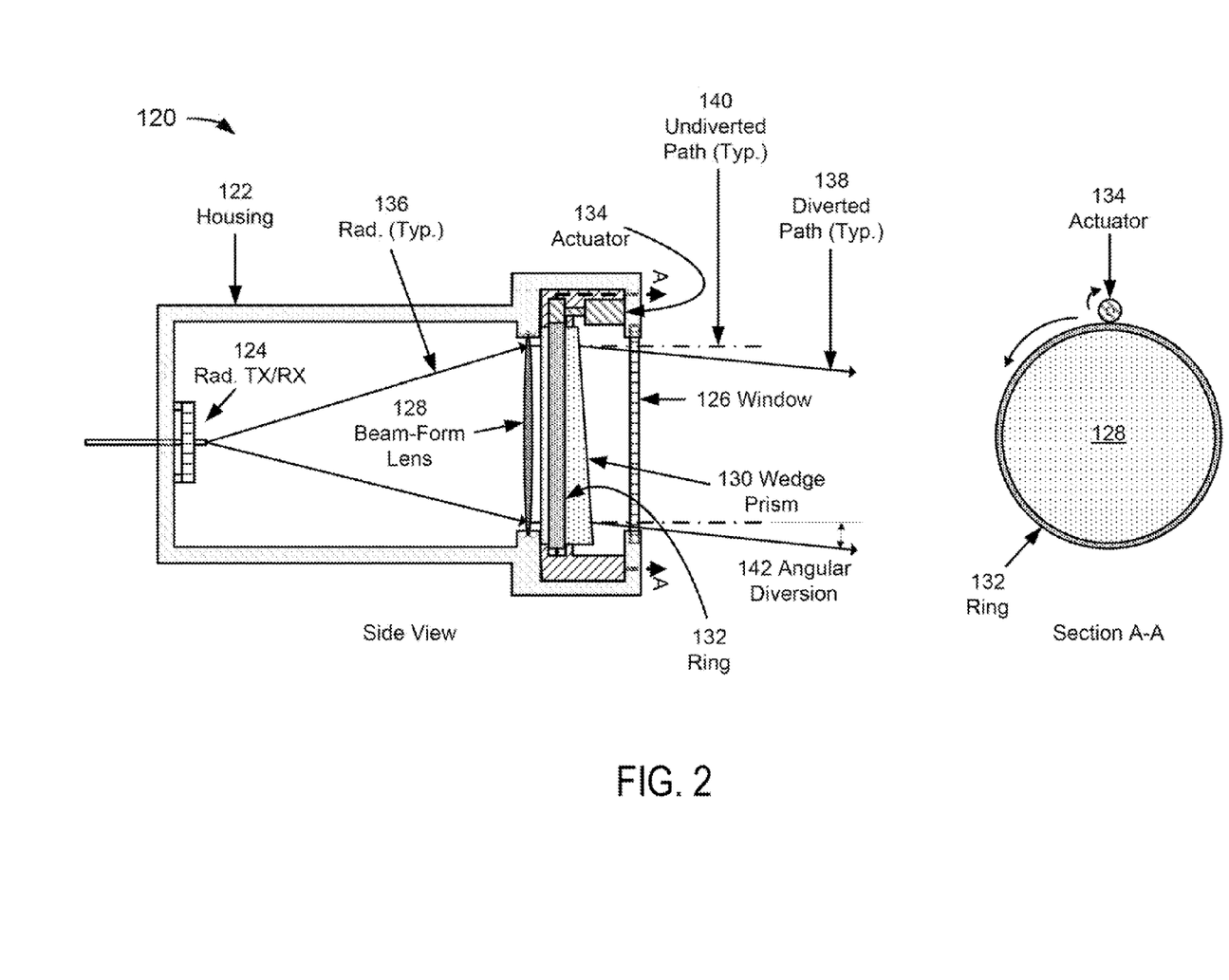
FIG. 2 depicts an optical, laser-based measuring housing assembly suitable for implementing a disclosed optical, laser-based measuring system.

In an embodiment of FIG. 2, a housing assembly 120 suitable for implementation of the measuring system 100 described herein is depicted. The assembly 120 may be comprised of a housing 122 that encloses a radiation TX/RX 124, an aperture window 126, a beam-forming refractive optical element of a beam-forming lens 128, and a beam steering device comprised of a deviation optical element of an optical wedge prism 130 joined with a ring 132 and a rotary actuator 134 for rotating both.

Referring to FIG. 2, radiation 136 is promulgated from the radiation TX/RX 124 and subjected to the beam-forming lens 128 to produce beams of radiation including, but not limited to, collimated, near-collimated, and/or convergent beams of radiation; although the promulgated radiation is shown as being promulgated through free space in all of the drawings disclosed herein, such promulgation is not limited to free space but could included other mediums such as, but not limited to, a fiber optic and/or a waveguide. Then, such beam of radiation is subjected to the optical wedge prism 130 which, in turn, causes the beam of radiation to be diverted to a diverted path 138 and away from the undiverted path 140 by an amount equal to the angular diversion 142; as embodied herein, the optical wedge prism 130 may be fabricated of a material appropriate to refract the wavelength of radiation entering from the optical wedge prism 130 and with appropriately angled faces defined to achieve a chosen angular diversion 142. Then, the beam of radiation travels along the diverted path 138 as it exits the apparatus 120 by passing through the aperture window 126 located at the aperture of the housing 122; it should be noted that the aperture windows disclosed herein are optional and may be comprised of more than one window. Upon being reflected by atmospheric particles, a reflected signal may then retrace the diverted path 138 by passing through the aperture window 126, the optical wedge prism 130, and the beam-forming lens 128 which causes the reflected signal to converge on the radiation TX/RX 124. The radiation TX/RX 124 may detect the reflected signal, from which the wind velocity, for example, may be determined.

Figure 3:
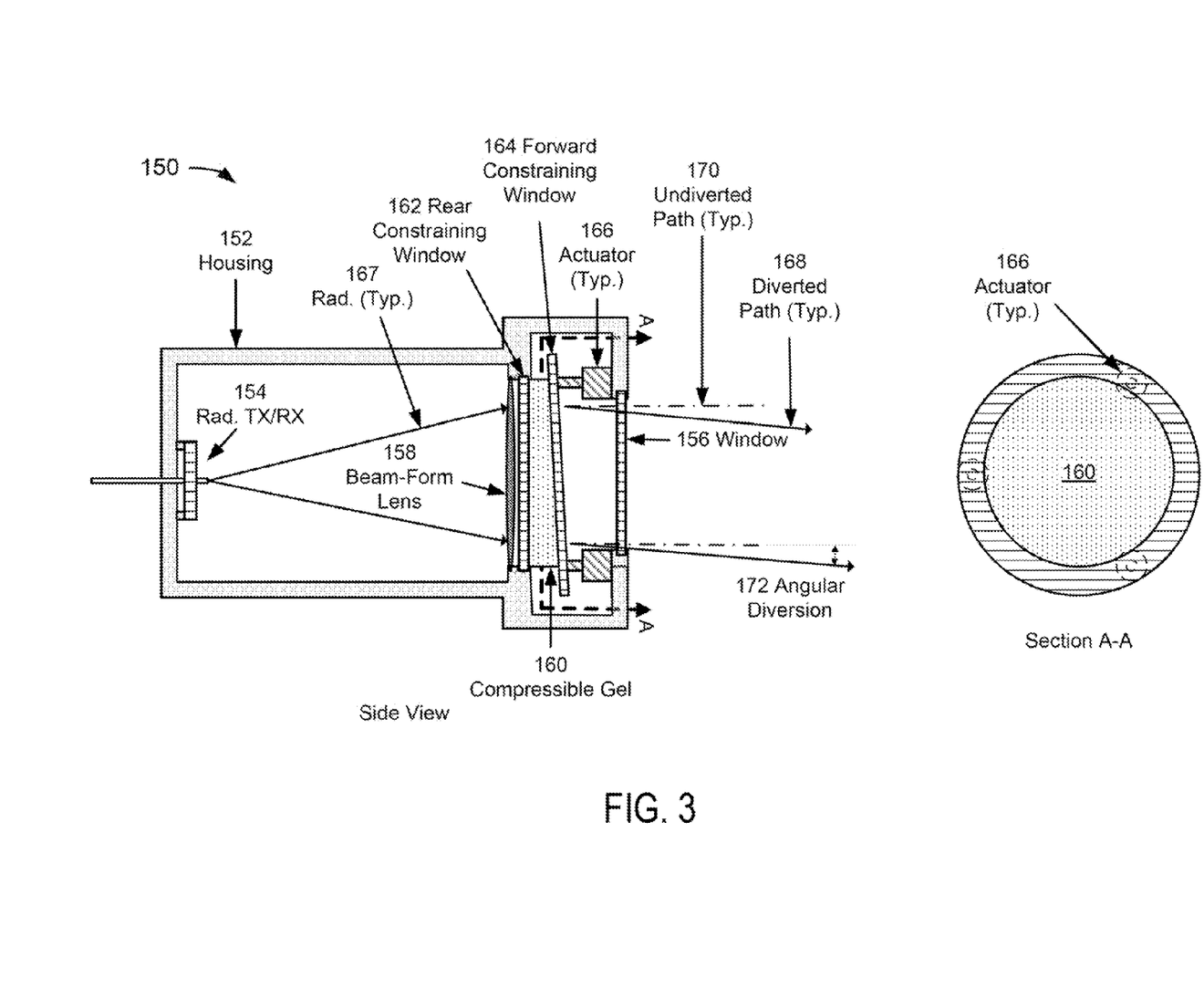
FIG. 3 depicts a second optical, laser-based measuring housing assembly suitable for implementing a disclosed optical, laser-based measuring system.

In an embodiment of FIG. 3, an optical, laser-based measuring housing assembly 150 suitable for implementation of the measuring system 100 described herein is depicted. The assembly 150 may be comprised of a housing 152 that encloses a radiation TX/RX 154, an aperture window 156, a beam-forming refractive optical element of a beam-forming lens 158, and a beam steering device comprised of a deviation optical element of a compressible gel 160 sandwiched in between a rear constraining window 162 and a forward constraining window 164, and a plurality of linear actuators 166 whose synchronized movement may form the compressible gel 160 into a variable-angle optical wedge prism in between the rear and forward constraining windows 162 and 164. It should be noted that, although the linear actuators 166 are shown to be attached to the forward constraining window 164 only, linear actuators could be attached to the rear constraining window 162. As embodied herein, linear actuators could be attached to either one of the constraining windows or both of the constraining windows.

Referring to FIG. 3, radiation 167 is promulgated from the radiation TX/RX 154 and subjected to the beam-forming lens 158 to produce beams of radiation including, but not limited to, collimated, near-collimated, and/or convergent beams of radiation. Then, such beam of radiation is subjected to the variable-angle optical wedge prism in between the rear and forward constraining windows 162 and 164 which, in turn, causes the beam of radiation to be diverted to a diverted path 168 and away from the undiverted path 170 by an amount equal to the angular diversion 172. Then, the beam of radiation travels along the diverted path 168 as it exits the assembly 150 by passing through the aperture window 156 located at the aperture of the housing 152. Upon being reflected by atmospheric particles, a reflected signal may then retrace the path of the beam of radiation by passing through the aperture window 156, the variable-angle optical wedge prism in between the forward and rear constraining windows 164 and 162, and the beam-forming lens 158 which causes the reflected signal to converge on the radiation TX/RX 154. The radiation TX/RX 154 may detect the reflected signal, from which the wind velocity, for example, may be determined.

Figure 4:
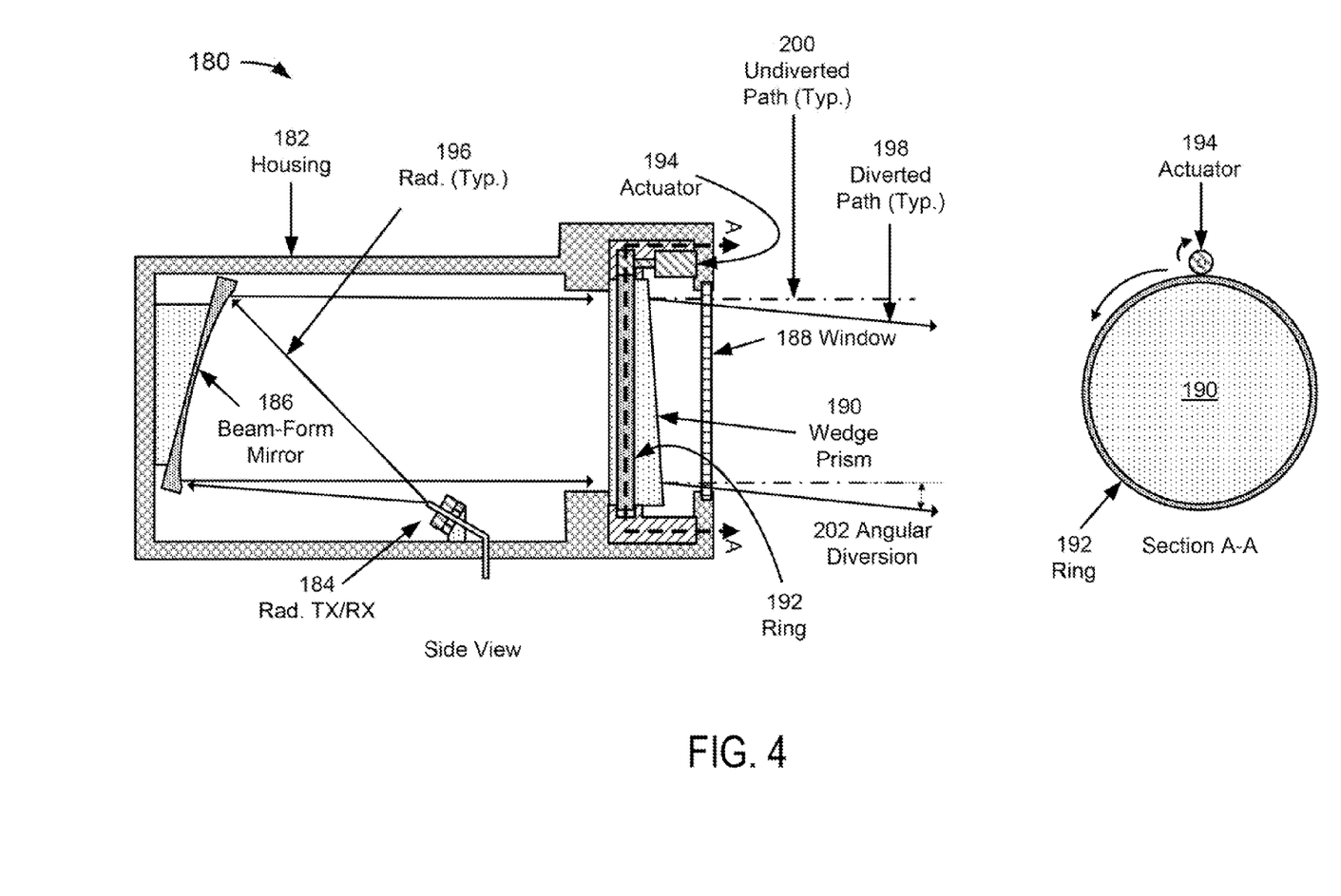
FIG. 4 depicts a third optical, laser-based measuring housing assembly suitable for implementing a disclosed optical, laser-based measuring system.

In an embodiment of FIG. 4, a housing assembly 180 suitable for implementation of the measuring system 100 described herein is depicted. The assembly 180 may be comprised of a housing 182 that encloses a radiation TX/RX 184, a beam-forming reflective optical element of a beam-forming mirror 186 (e.g., an off-axis paraboloid mirror), an aperture window 188, and a beam steering device comprised of a deviation optical element of an optical wedge prism 190 joined with a ring 192, and a rotary actuator 194 for rotating both.

Referring to FIG. 4, radiation 196 is promulgated from the radiation TX/RX 184 and subjected to the beam-forming mirror 186 to produce beams of radiation including, but not limited to, collimated, near-collimated, and/or convergent beams of radiation. Then, such beam of radiation is subjected to the optical wedge prism 190 which, in turn, causes the beam of radiation to be diverted to a diverted path 198 and away from the undiverted path 200 by an amount equal to the angular diversion 202; as embodied herein, the optical wedge prism 190 may be fabricated of a material appropriate to refract the wavelength of radiation entering from the optical wedge prism 190 and with appropriately angled faces defined to achieve a chosen angular diversion 202. Then, the beam of radiation travels along the diverted path 198 as it exits the apparatus 180 by passing through the aperture window 188 located at the aperture of the housing 182. Upon being reflected by atmospheric particles, a reflected signal may then retrace the path of the beam of radiation by passing through the aperture window 188 and the optical wedge prism 190, then being subjected to the beam-forming mirror 186 which causes the reflected signal to be redirected so that it may converge on the radiation TX/RX 184. The radiation TX/RX 184 may detect the reflected signal, from which the wind velocity, for example, may be determined.

Figure 5:
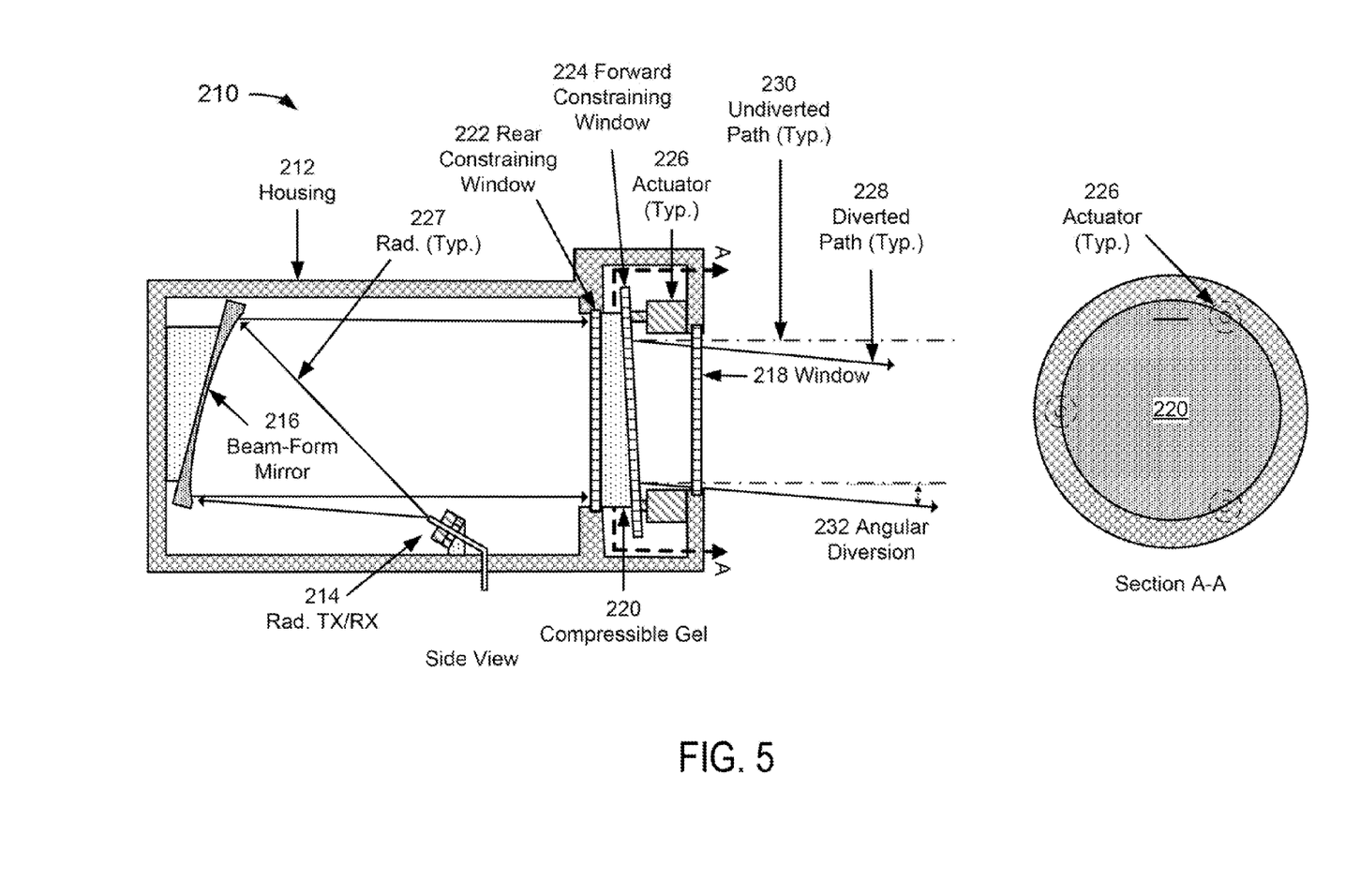
FIG. 5 depicts a fourth optical, laser-based measuring housing assembly suitable for implementing a disclosed optical, laser-based measuring system.

In an embodiment of FIG. 5, a housing assembly 210 suitable for implementation of the measuring system 100 described herein is depicted. The assembly 210 may be comprised of a housing 212 that encloses a radiation TX/RX 214, a beam-forming reflective optical element of a beam-forming mirror 216 (e.g., an off-axis paraboloid mirror), an aperture window 218, and a beam steering device comprised of a deviation optical element of a compressible gel 220 sandwiched in between a rear constraining window 222 and a forward constraining window 224, and a plurality of linear actuators 226 whose synchronized movement may form the compressible gel 220 into a variable-angle optical wedge prism in between the rear and forward constraining windows 222 and 224. It should be noted that, although the linear actuators 226 are shown to be attached to the forward constraining window 224 only, linear actuators could be attached to the rear constraining window 222. As embodied herein, linear actuators could be attached to either one of the constraining windows or both of the constraining windows.

Referring to FIG. 5, radiation 227 is promulgated from the radiation TX/RX 244 and subjected to the beam-forming mirror 216 to produce beams of radiation including, but not limited to, collimated, near-collimated, and/or convergent beams of radiation. Then, such beam of radiation is subjected to the variable-angle optical wedge prism in between the rear and forward constraining windows 222 and 224 which, in turn, causes the beam of radiation to be diverted to a diverted path 228 and away from the undiverted path 230 by an amount equal to the angular diversion 232. Then, the beam of radiation travels along the diverted path 228 as it exits the assembly 210 by passing through the aperture window 218 located at the aperture of the housing 212. Upon being reflected by atmospheric particles, a reflected signal may then retrace the path of the beam of radiation by passing through the aperture window 218, the variable-angle optical wedge prism in between the forward and rear constraining windows 224 and 222, and the beam-forming mirror 216 which causes the reflected signal to converge on the radiation TX/RX 214. The radiation TX/RX 214 may detect the reflected signal, from which the wind velocity, for example, may be determined.

Figure 6:
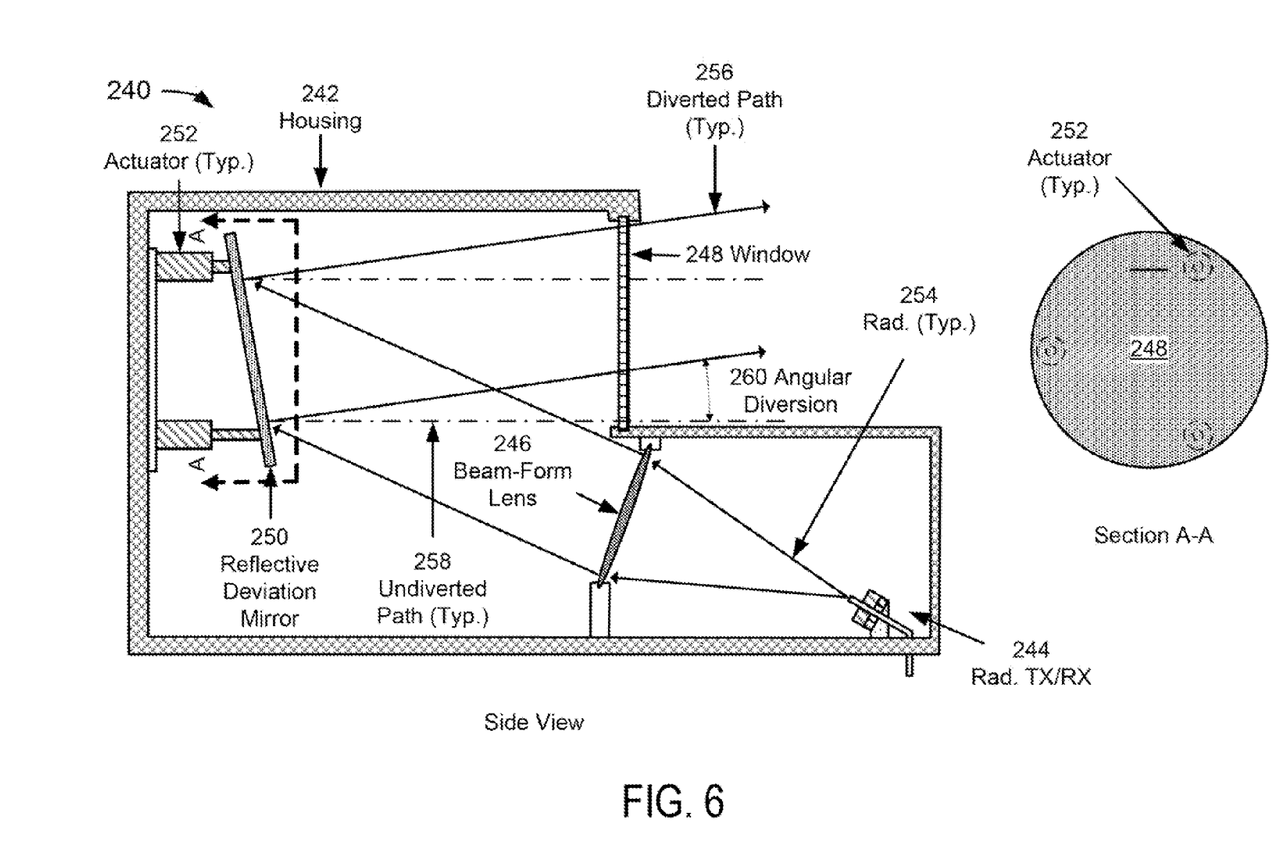
FIG. 6 depicts a fifth optical, laser-based measuring housing assembly suitable for implementing a disclosed optical, laser-based measuring system.

In an embodiment of FIG. 6, a housing assembly 240 suitable for implementation of the measuring system 100 described herein is depicted. The assembly 240 may be comprised of a housing 242 that encloses a radiation TX/RX 244, a beam-forming refractive optical element of a beam-forming lens 246, an aperture window 248, and a beam steering device comprised of a deviation optical element of a reflective deviation mirror 250 and a plurality of linear actuators 252 for positioning the reflective deviation mirror 250.

Referring to FIG. 6, radiation 254 is promulgated from the radiation TX/RX 244 and subjected to the beam-forming lens 246 to produce beams of radiation including, but not limited to, collimated, near-collimated, and/or convergent beams of radiation. Then, such beam of radiation is subjected to the reflective deviation mirror 250 which, in turn, causes the beam of radiation to be diverted to a diverted path 256 and away from the undiverted path 258 by an amount equal to the angular diversion 260. Then, the beam of radiation travels along the diverted path 256 as it exits the assembly 240 by passing through the aperture window 248 located at the aperture of the housing 242. Upon being reflected by atmospheric particles, a reflected signal may then retrace the path of the beam of radiation by passing through the aperture window 248 and being subjected to the reflective deviation mirror 250 which causes the reflected signal to be redirected so that it may converge on the radiation TX/RX 244 after begin subjected to the beam-forming lens 246. The radiation TX/RX 244 may detect the reflected signal, from which the wind velocity, for example, may be determined.

Figure 7:
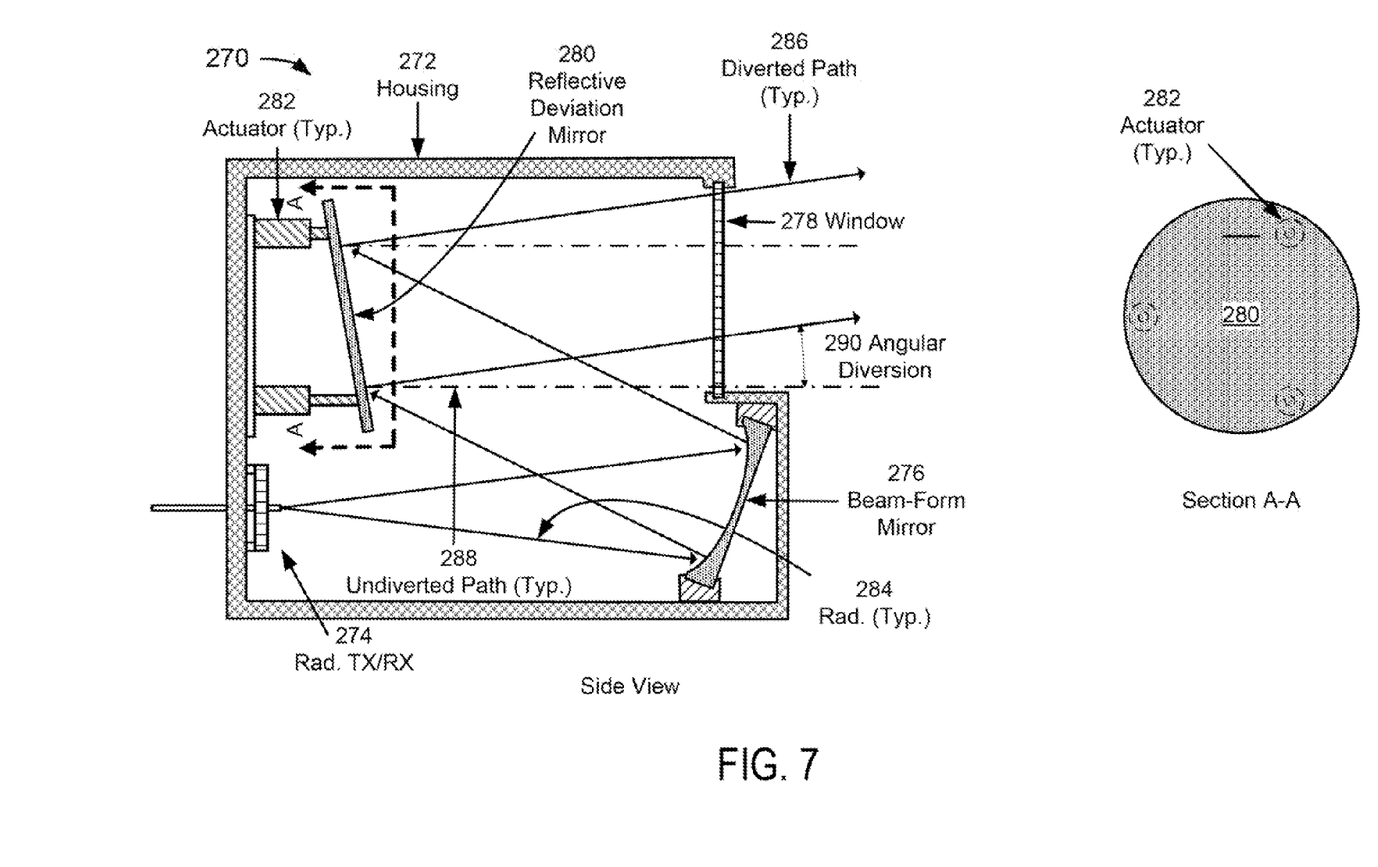
FIG. 7 depicts a sixth optical, laser-based measuring housing assembly suitable for implementing a disclosed optical, laser-based measuring system.

In an embodiment of FIG. 7, a housing assembly 270 suitable for implementation of the measuring system 100 described herein is depicted. The assembly 270 may be comprised of a housing 272 that encloses a radiation TX/RX 274, a beam-forming reflective optical element of a beam-forming mirror 276, an aperture window 278, and a beam steering device comprised of a deviation optical element of a reflective deviation mirror 280 and a plurality of linear actuators 282 for positioning the reflective deviation mirror 280.

Referring to FIG. 7, radiation 284 is promulgated from the radiation TX/RX 274 and subjected to the beam-forming mirror 276 to produce beams of radiation including, but not limited to, collimated, near-collimated, and/or convergent beams of radiation. Then, such beam of radiation is subjected to the reflective deviation mirror 280 which, in turn, causes the beam of radiation to be diverted to a diverted path 286 and away from the undiverted path 288 by an amount equal to the angular diversion 290. Then, the beam of radiation travels along the diverted path 316 as it exits the apparatus 270 by passing through the aperture window 278 located at the aperture of the housing 272. Upon being reflected by atmospheric particles, a reflected signal may then retrace the path of the beam of radiation by passing through the aperture window 278 and being subjected to the reflective deviation mirror 280 which causes the reflected signal to be redirected so that it may converge on the radiation TX/RX 274 after being subjected to the beam-forming mirror 276. The radiation TX/RX 274 may detect the reflected signal, from which the velocity, for example, may be determined.

Figure 8:
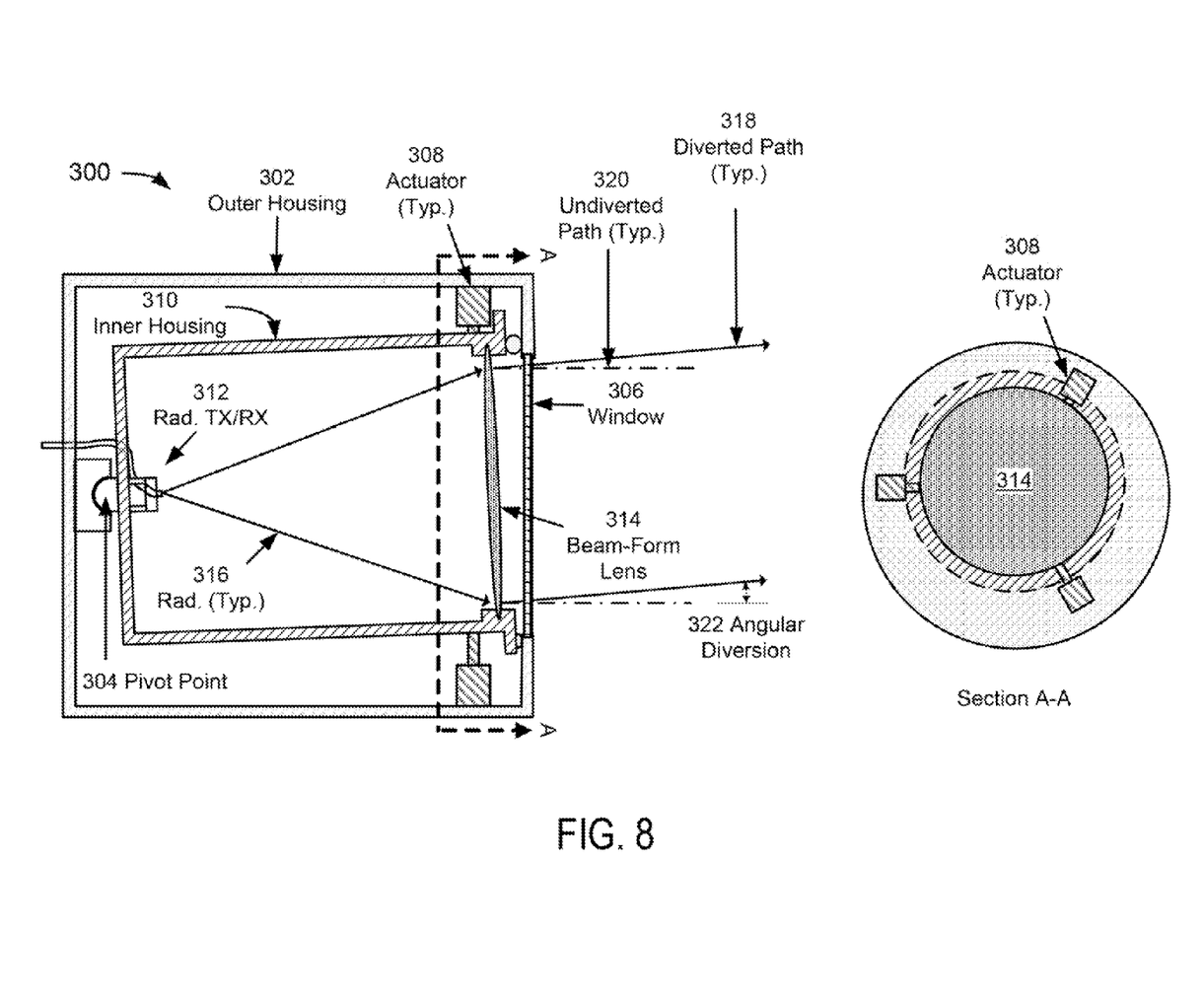
FIG. 8 depicts a seventh optical, laser-based measuring housing assembly suitable for implementing a disclosed optical, laser-based measuring system.

In an embodiment of FIG. 8, a housing assembly 300 suitable for implementation of the measuring system 100 described herein is depicted. The assembly 300 may be comprised of an outer housing 302, a pivot point 304, an aperture window 306, a plurality of linear actuators 308 for positioning an inner housing 310, and a steering optical element comprised of the inner housing 310, a radiation TX/RX 312, and a beam-forming refractive optical element of a beam-forming lens 314.

Referring to FIG. 8, radiation 316 is promulgated from the radiation TX/RX 312 and subjected to the beam-forming lens 314 to produce beams of radiation including, but not limited to, collimated, near-collimated, and/or convergent beams of radiation. The position of the inner housing 310 determines the extent of which beam of radiation will be diverted to a diverted path 318 and away from the undiverted path 320 by an amount equal to the angular diversion 322. Then, the beam of radiation exits the apparatus 300 by passing through the aperture window 306 located at the aperture of the outer housing 302. Upon being reflected by atmospheric particles, a reflected signal may then retrace the path of the beam of radiation by passing through the aperture window 306 and the beam-forming lens 314 which causes the reflected signal to converge on the radiation TX/RX 312. The radiation TX/RX 312 may detect the reflected signal, from which the wind velocity, for example, may be determined.

In an embodiment of FIG. 9, a housing assembly 330 suitable for implementation of the measuring system 100 described herein is depicted. The assembly 330 may be comprised of an outer housing 332, a pivot point 334, an aperture window 336, a plurality of linear actuators 338 for positioning an inner housing 340, and a steering optical element comprised of the inner housing 340, a radiation TX/RX 342, and a beam-forming reflective optical element of a beam-forming mirror 344.

Referring to FIG. 9, radiation 346 is promulgated from the radiation TX/RX 342 and subjected to the beam-forming mirror 344 to produce beams of radiation including, but not limited to, collimated, near-collimated, and/or convergent beams of radiation. The position of the inner housing 340 determines the extent of which beam of radiation will be diverted to a diverted path 348 and away from the undiverted path 350 by an amount equal to the angular diversion 352. Then, the beam of radiation exits the apparatus 330 by passing through the aperture window 336 located at the aperture of the outer housing 332. Upon being reflected by atmospheric particles, a reflected signal may then retrace the path of the beam of radiation by passing through the aperture window 336 and the beam-forming mirror 344 which causes the reflected signal to converge on the radiation TX/RX 342. The radiation TX/RX 342 may detect the reflected signal, from which the wind velocity, for example, may be determined.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:
1. A measuring system, such system comprising:
an apparatus comprised of
 a radiation transmitter/receiver configured to
  receive a transmit signal from a processor,
  promulgate radiation in response to the receiving of the transmit signal,
  detect a reflected signal, and
  provide a detection signal to the processor in response to the detecting of the reflected signal;
 a beam-forming optical element configured to
  receive the promulgated radiation from the radiation transmitter/receiver,
  form a beam of radiation, where
   the beam of radiation, upon being formed, travels to a beam steering device along an undiverted path,
  receive the reflected signal from the beam steering device, and
  direct the reflected signal to the radiation transmitter/receiver;
 the beam steering device comprised of a deviation optical element and at least one actuator, where
  the deviation optical element is configured to
   receive the beam of radiation from the beam-forming optical element,
   divert the beam of radiation away from the undiverted path and onto a diverted path, such that the diverted beam of radiation travels into the atmosphere along the diverted path,
   receive the reflected signal retracing the diverted path, and
   divert the reflected signal away from the diverted path, such that
    the reflected signal is subjected to the beam-forming optical element while retracing the undiverted path, and
  each actuator is configured to
   drive the deviation optical element in response at least one drive signal; and
the processor configured to
 provide at least one drive signal to each actuator of the beam steering device, where
  one drive signal is provided if the actuator is continuously driven, or
  a plurality of drive signals is provided repeatedly if the actuator is not continuously driven,
 provide a transmit signal to the radiation transmitter/receiver, where
  the providing of the transmit signal is synchronized with each predetermined position of a plurality of predetermined positions of the beam steering device, and
 receive a detection signal from the radiation transmitter/receiver, whereby
  a value representative of a measurement is determined.

2. The system of claim 1, wherein
the reflected signal is produced from an interaction between the diverted beam of radiation and atmospheric particles, and
the value representative of a measurement is a value of wind speed.

3. The system of claim 1, wherein
the beam-forming optical element is comprised of a beam-forming refractive optical element,
the deviation optical element is comprised of an optical wedge prism, and
the at least one actuator is comprised of a rotary actuator for providing a rotational engagement with the optical wedge prism, such that
the rotational motion of the rotary actuator drives the optical wedge prism in response to at least one drive signal received from the processor.

4. The system of claim 1, wherein
the beam-forming optical element is comprised of a beam-forming refractive optical element,
the deviation optical element is comprised of
a rear constraining window,
a forward constraining window, and
a compliant refractive material pressed in between the rear constraining window and the forward constraining window, and
the at least one actuator is comprised of a plurality of linear actuators, where
each linear actuator provides for a pivotal engagement with the rear constraining window, the forward constraining window, or both, such that
the combination of linear motions of the plurality of linear actuators drives each pivotally-engaged constraining window in response to at least one drive signal received from the processor, whereby
the rear constraining window and the forward constraining window press against the compliant refractive material to form an optical wedge prism.

5. The system of claim 1, wherein
the beam-forming optical element is comprised of a beam-forming reflective optical element,
the deviation optical element is comprised of an optical wedge prism, and
the at least one actuator is comprised of a rotary actuator for providing a rotational engagement with the optical wedge prism, such that
the rotational motion of the rotary actuator drives the optical wedge prism in response to at least one drive signal received from the processor.

6. The system of claim 1, wherein
the beam-forming optical element is comprised of a beam-forming reflective optical element,
the deviation optical element is comprised of
a rear constraining window,
a forward constraining window, and
a compliant refractive material pressed in between the rear constraining window and the forward constraining window, and
the at least one actuator is comprised of a plurality of linear actuators, where
each linear actuator provides for a pivotal engagement with the rear constraining window, the forward constraining window, or both, such that
the combination of linear motions of the plurality of linear actuators drives each pivotally-engaged constraining window in response to at least one drive signal received from the processor, whereby
the rear constraining window and the forward constraining window press against the compliant refractive material to form an optical wedge prism.

7. The system of claim 1, wherein
the beam-forming optical element is comprised of a beam-forming refractive optical element,
the deviation optical element is comprised of reflective deviation mirror, and
the at least one actuator is comprised of a plurality of linear actuators, where each linear actuator provides for a pivotal engagement with the reflective deviation mirror, such that
the combination of linear motions of the plurality of linear actuators drives the reflective deviation mirror in response to at least one drive signal received from the processor.

8. The system of claim 1, wherein
the beam-forming optical element is comprised of a beam-forming reflective optical element,
the deviation optical element is comprised of reflective deviation mirror, and
the at least one actuator is comprised of a plurality of linear actuators, where each linear actuator provides for a pivotal engagement with the reflective deviation mirror, such that
the combination of linear motions of the plurality of linear actuators drives the reflective deviation mirror in response to at least one drive signal received from the processor.

9. A method employed by an apparatus of a measuring system, such method comprising:
receiving radiation promulgated from a radiation transmitter/receiver;
forming a beam of radiation with a beam-forming optical element, where
the beam of radiation, upon being formed, travels along an undiverted path;
diverting the beam of radiation away from the undiverted path and onto a diverted path with a beam steering device comprised of a deviation optical element and at least one actuator, where
the diverted beam of radiation travels into the atmosphere along the diverted path;
receiving a reflected signal retracing the diverted path;
diverting the reflected signal away from the diverted path, such that
the reflected signal retraces the undiverted path; and
forming a converging signal from the reflected signal with the beam-forming optical element, whereby
the converging signal is directed by the beam-forming optical element to the radiation transmitter/receiver.

10. The method of claim 9, wherein
the reflected signal is produced from an interaction between the diverted beam of radiation and atmospheric particles.

11. The method of claim 9, wherein
the beam-forming optical element is comprised of a beam-forming refractive optical element,
the deviation optical element is comprised of an optical wedge prism, and
the at least one actuator is comprised of a rotary actuator for providing a rotational engagement with the optical wedge prism.

12. The method of claim 9, wherein
the beam-forming optical element is comprised of a beam-forming refractive optical element,
the deviation optical element is comprised of
a rear constraining window,
a forward constraining window, and
a compliant refractive material pressed in between the rear constraining window and the forward constraining window, and
the at least one actuator is comprised of a plurality of linear actuators, where
each linear actuator provides for a pivotal engagement with the rear constraining window, the forward constraining window, or both.

13. The method of claim 9, wherein
the beam-forming optical element is comprised of a beam-forming reflective optical element,
the deviation optical element is comprised of an optical wedge prism, and
the at least one actuator is comprised of a rotary actuator for providing a rotational engagement with the optical wedge prism.

14. The method of claim 9, wherein
the beam-forming optical element is comprised of a beam-forming reflective optical element,
the deviation optical element is comprised of
a rear constraining window,
a forward constraining window, and
a compliant refractive material pressed in between the rear constraining window and the forward constraining window, and
the at least one actuator is comprised of a plurality of linear actuators, where
each linear actuator provides for a pivotal engagement with the rear constraining window, the forward constraining window, or both.

15. The method of claim 9, wherein
the beam-forming optical element is comprised of a beam-forming refractive optical element,
the deviation optical element is comprised of reflective deviation mirror, and
the at least one actuator is comprised of a plurality of linear actuators, where
each linear actuator provides for a pivotal engagement with the reflective deviation mirror.

16. The method of claim 9, wherein
the beam-forming optical element is comprised of a beam-forming reflective optical element,
the deviation optical element is comprised of reflective deviation mirror, and
the at least one actuator is comprised of a plurality of linear actuators, where
each linear actuator provides for a pivotal engagement with the reflective deviation mirror.

17. A measuring system, such system comprising:
a first housing configured with a pivot point;
a steering optical element located within and pivotally engaged with the first housing at the pivot point, wherein the steering optical element is comprised of
a second housing,
a radiation transmitter/receiver configured to
receive a transmit signal from a processor,
promulgate radiation in response to the receiving of the transmit signal,
detect a reflected signal corresponding to the promulgated radiation, and
provide a detection signal to the processor in response to the detecting of the reflected signal,
a beam-forming optical element configured to
receive the promulgated radiation from the radiation transmitter/receiver,
form a beam of radiation, where
the beam of radiation travels into the atmosphere along a diverted path,
receive the reflected signal traveling along the diverted path, and
direct the reflected signal to the radiation transmitter/receiver;
at least one actuator, where
each actuator is configured to drive the steering optical element in response at least one drive signal; and
the processor configured to
provide at least one drive signal to each actuator of the steering optical element, where
one drive signal is provided if the actuator is continuously driven, or
a plurality of drive signals is provided repeatedly if the actuator is not continuously driven,
provide a transmit signal to the radiation transmitter/receiver, where
the providing of the transmit signal is synchronized with each predetermined position of a plurality of predetermined positions of the steering optical element, and
receive a detection signal from the radiation transmitter/receiver, whereby
a value representative of a measurement is determined.

18. The system of claim 17, wherein
the reflected signal is produced from an interaction between the beam of radiation and atmospheric particles, and
the value representative of a measurement is a value of wind speed.

19. The system of claim 17, wherein beam-forming optical element is comprised of a beam-forming refractive optical element.

20. The system of claim 17, wherein beam-forming optical element is comprised of a beam-forming reflective optical element.

21. The system of claim 17, wherein
the at least one actuator is comprised of a plurality of linear actuators located in between the first housing and the second housing, where
each linear actuator is pivotally engaged with the second housing, such that
the plurality of linear actuators drives the steering optical element in response to drive signals received from the processor.

* * * * *